(12) United States Patent
Noda et al.

(10) Patent No.: US 7,806,251 B2
(45) Date of Patent: Oct. 5, 2010

(54) PANEL-CARRYING-OUT APPARATUS

(75) Inventors: Shigekazu Noda, Kanazawa (JP); Akio Kawato, Komatsu (JP); Koji Uozumi, Komatsu (JP)

(73) Assignee: Komatsu Ltd., Tokyo (JP)

( * ) Notice: Subject to any disclaimer, the term of this patent is extended or adjusted under 35 U.S.C. 154(b) by 64 days.

(21) Appl. No.: 12/186,094

(22) Filed: Aug. 5, 2008

(65) Prior Publication Data

US 2009/0038910 A1    Feb. 12, 2009

(51) Int. Cl.
  *B65G 47/72*    (2006.01)
(52) U.S. Cl. .................. 198/601; 198/575; 198/597; 198/371.2
(58) Field of Classification Search .............. 198/575, 198/597, 598, 601, 773, 890.1, 370.06, 370.1, 198/371.2
  See application file for complete search history.

(56) References Cited

U.S. PATENT DOCUMENTS

| | | | |
|---|---|---|---|
| 4,140,213 A * | 2/1979 | Denison | ............ 198/358 |
| 5,671,837 A | 9/1997 | Tazou et al. | |
| 6,830,144 B2 | 12/2004 | Dorner | |

FOREIGN PATENT DOCUMENTS

| | | |
|---|---|---|
| JP | 6-345254 A | 12/1994 |
| JP | 8-300074 A | 11/1996 |
| JP | 3051893 U | 6/1998 |
| JP | 2001-1088 A | 1/2001 |
| JP | 2001-1089 A | 1/2001 |
| JP | 2001-10711 A | 1/2001 |
| JP | 2001-72219 A | 3/2001 |

* cited by examiner

*Primary Examiner*—Joe Dillon, Jr.
(74) *Attorney, Agent, or Firm*—Frishauf, Holtz, Goodman & Chick, P.C.

(57) ABSTRACT

A panel-carrying-out apparatus used for conveying panels ejected from a press machine includes: a semicircular sorting conveyor adapted to be driven switchably in a normal direction or a reverse direction; and a pair of straight conveyors respectively disposed at ends of the sorting conveyor. Each of the panels from the press machine is mounted on the center position of the sorting conveyor in terms of a conveying path. Specifically, an arced conveyor included in the sorting conveyor, on which each of the panels is initially mounted, is adapted to be driven switchably in the normal direction or the reverse direction.

9 Claims, 12 Drawing Sheets

PANEL-CARRYING-OUT APPARATUS

BACKGROUND OF THE INVENTION

1. Field of the Invention

The present invention relates to a panel-carrying-out apparatus, an example of which is a carrying-out apparatus for carrying out panel products manufactured by a press machine.

2. Description of Related Art

A number of panel-carrying-out apparatuses for loading in a container such as a pallet panel products ejected from a press line are conventionally known (for instance, see Document 1: JP-A-6-345254, Document 2: JP-A-2001-1088. Document 3: JP-A-2001-1089, Document 4: Specification of U.S. Pat. No. 6,830,144). In such an apparatus, panels are turned by 90 degrees by use of a robot sorting device provided therein. With such an arrangement, inspection and loading of the panels are facilitated, thereby coping with an increase in manufacturing speed and size of the panels.

However, since such a conventional panel-carrying-out apparatus requires a robot sorting device for turning panels by 90 degrees, a larger space is required for installing such a conventional panel-carrying-out apparatus. In addition, with such a robot sorting device requiring a positioning device for positioning panels, the entirety of such a panel-carrying-out apparatus tends to be large scale, thereby increasing a manufacturing cost.

SUMMARY OF THE INVENTION

An object of the present invention is to provide, in order to cope with an increase in manufacturing speed and size of the panels, a panel-carrying-out apparatus that is excellent in convenience and capable of saving space, reducing cost and dispensing with a robot sorting device in inspecting and loading panels.

A panel-carrying-out apparatus according to an aspect of the present invention is used for conveying panels ejected from a press machine, the apparatus including: a sorting conveyor that sorts out the panels transferred from the press machine; and a pair of straight conveyors respectively disposed at ends of the sorting conveyor, in which the sorting conveyor comprises: a first conveyor on which each of the panels from the press machine is initially mounted; and a pair of arced conveyors respectively disposed at ends of the first conveyor, and at least the first conveyor is driven switchably in a normal direction or a reverse direction.

According to the aspect of the present invention, the sorting conveyor is disposed at a position downstream to the press machine and the first conveyor of the sorting conveyor on which the panels each are initially mounted, is adapted to be driven in the normal or reverse direction. With this arrangement, the panel mounted on the first conveyor can be conveyed to the arced conveyor located in the normal rotary direction, and a next new panel can be mounted on the first conveyor as soon as the first conveyor becomes vacant, so that the next new panel mounted thereon can be conveyed to the other arced conveyor located in the reverse rotary direction by driving the first conveyor in the reverse direction. In other words, the first conveyor can receive a new panel from the press machine without waiting for the panel initially carried to the first conveyor to be conveyed to the straight conveyor, and efficiently sort out the panels. Accordingly, the panel-carrying-out apparatus is applicable to high-speed manufacturing. In addition, the arced conveyors turn the panels by 90 degrees to convey the panels to the straight conveyors, thereby enhancing the handleability in conveying larger panels. Although a conventional arrangement requires a positioning device for positioning the panels in addition to a robot sorting device for sorting out the panels, these devices can be omitted with the sorting conveyor being provided, thereby reducing a space required for installing the panel-carrying-out apparatus and considerably reducing manufacturing cost of the apparatus.

Preferably in the panel-carrying-out apparatus according to the aspect of the present invention, the first conveyor is shaped as an arc, the first conveyor and the arced conveyors are disposed along a circumferential direction, the sorting conveyor includes the arc-shaped first conveyor and at least the pair of arced conveyors, and the arc-shaped first conveyor has such a size that a single one of the panels is substantially mounted on the arc-shaped first conveyor.

Preferably in the panel-carrying-out apparatus according to the aspect of the present invention, the first conveyor is linearly shaped, the sorting conveyor includes the linearly-shaped first conveyor and at least the pair of arced conveyors, and the linearly-shaped first conveyor has such a size that a single one of the panels is substantially mounted on the linearly-shaped first conveyor.

According to the aspect of the present invention, the arc-shaped first conveyor or the linearly-shaped first conveyor of the sorting conveyor, on which each of the panels is initially mounted, is adapted to be driven in the normal or reverse direction while having such a size that a single one of the panels can be mounted thereon. With this arrangement, when the panel is conveyed from the arced-shaped or linearly-shaped first conveyor to the arced conveyor, a new panel can be reliably mounted on the arc-shaped first conveyor or the linearly-shaped first conveyor, thereby efficiently carrying out the panels.

Preferably in the panel-carrying-out apparatus according to the aspect of the present invention, a linearly-shaped intermediate conveyor is provided between the first conveyor and each of the arced conveyors of the sorting conveyor.

According to the aspect of the present invention, since the linearly-shaped intermediate conveyor is disposed at each end of the first conveyor, the driving speed of the first conveyor can be maintained at high speed irrespective of the driving speed of the arced conveyors. Accordingly, the panels can be conveyed from the first conveyor to the intermediate conveyor at high speed, thereby efficiently carrying out the panels.

Preferably in the panel-carrying-out apparatus according to the aspect of the present invention, the first conveyor is driven at high speed switchably in the normal direction or the reverse direction, the straight conveyors and the arced conveyors are continuously driven at low speed in predetermined directions respectively, and the intermediate conveyor is driven at high speed in a predetermined direction until the panels each are conveyed to the intermediate conveyor from the first conveyor while being driven at low speed in the predetermined direction until the panels each are conveyed to each of the arced conveyors from the intermediate conveyor.

According to the aspect of the present invention, since the first conveyor is driven at high speed switchably in the normal or reverse direction while the driving speed of the intermediate conveyor is switchable between the high speed and the low speed, the panels can be conveyed from the first conveyor to the intermediate conveyor at high speed and can be efficiently sorted out. Thus, the panel-carrying-out apparatus is applicable to high-speed manufacturing of the panels. In addition, since the arced conveyors and the straight conveyors convey the panels at low speed, an inspector can easily inspect the panels.

Preferably in the panel-carrying-out apparatus according to the aspect of the present invention, switch of driving speed of the intermediate conveyor between the high speed and the low speed is controlled based on a time elapse signal from a timer.

Preferably in the panel-carrying-out apparatus according to the aspect of the present invention, switch of driving speed of the intermediate conveyor between the high speed and the low speed is controlled based on a detection signal from a non-contact sensor for detecting the panels.

According to the aspect of the present invention, in order to detect that the panel has been conveyed from the first conveyor to the intermediate conveyor and that the intermediate conveyor has become vacant, the timer or the non-contact sensor is used. Thus, the driving speed of the intermediate conveyor can be automatically switched between the high speed and the low speed. In addition since the panels are conveyed at high speed until the panels reach the intermediate conveyor, the panel-carrying-out apparatus is applicable to high-speed manufacturing of the panels. On the other hand, since the arced conveyors and the straight conveyors are driven at low speed, an inspector can easily inspect the panels.

Preferably in the panel-carrying-out apparatus according to the aspect of the present invention, the sorting conveyor is adapted to be evacuated from a conveying path of the panels while the straight conveyors are extendable toward an upstream of the conveying path of the panels.

According to the aspect of the present invention, by evacuating the sorting conveyor while extending the telescopic straight conveyors, relatively-small manufactured panels can be conveyed directly to the straight conveyors from the press machine. With this arrangement, the panel-carrying-out apparatus is also applicable to an arrangement where two small panels are simultaneously manufactured by the press machine, thereby reducing manufacturing cost of the panel-carrying-out apparatus. Thus, the panel-carrying-out apparatus is excellent in convenience.

DETAILED DESCRIPTION OF PREFERRED EMBODIMENT(S)

Embodiment(s) of the present invention will be described below with reference to the attached drawings. It should be noted that, in later-made description of a second exemplary embodiment or the like, the same arrangement(s) as in the below-described first exemplary embodiment or arrangement(s) for performing the same function(s) as in the first embodiment will be denoted by the same numeral(s), description of which will be simplified or omitted.

First Exemplary Embodiment

Figure 1:
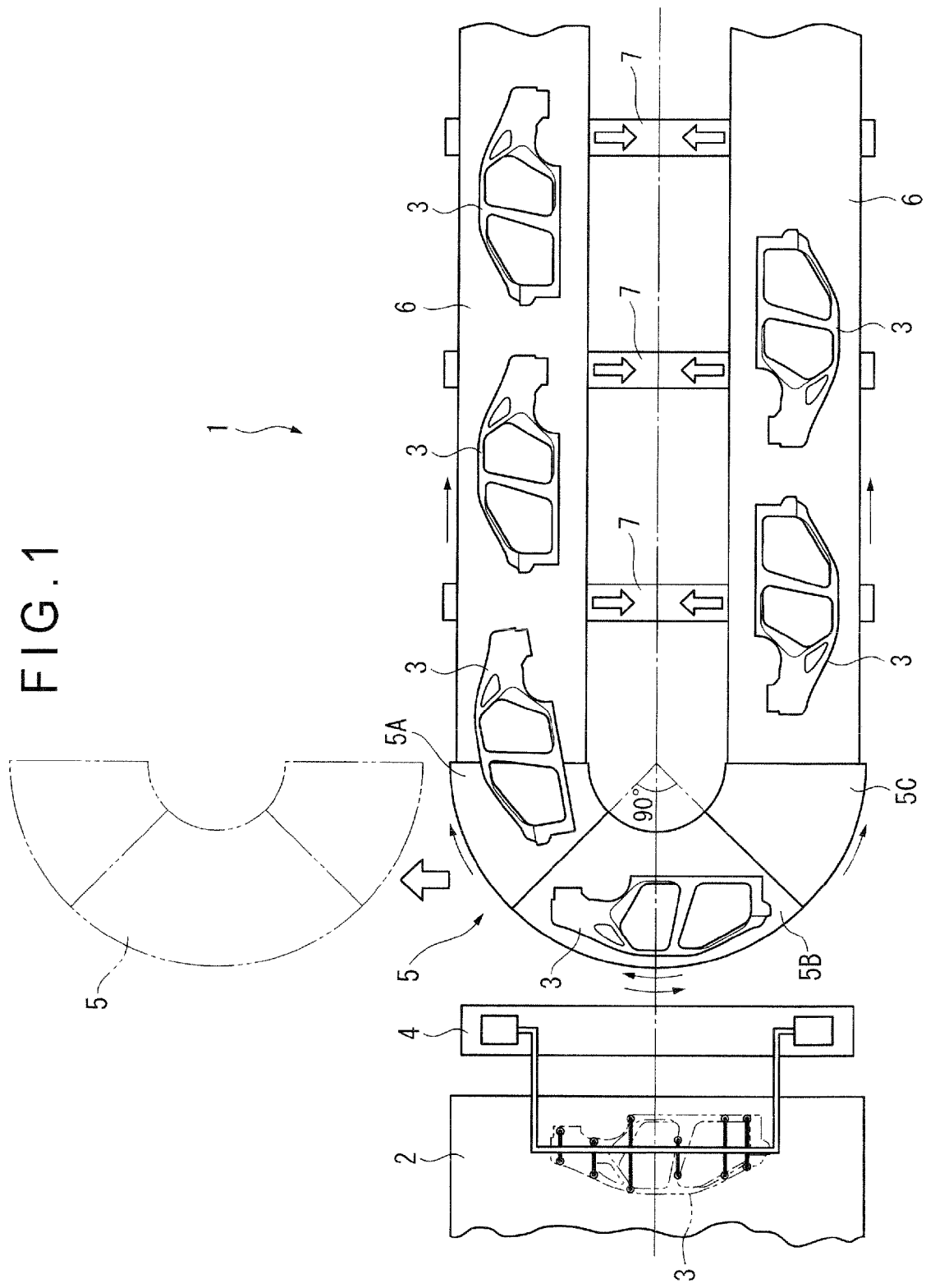
FIG. 1 is a plan view showing a panel-carrying-out apparatus according to a first exemplary embodiment of the present invention.

FIG. 1 is a plan view showing the entirety of a panel-carrying-out apparatus according to the first embodiment of the present invention.

In FIG. 1, the panel-carrying-out apparatus 1, which is disposed at a position downstream to a transfer robot 4 provided in a press line, includes a sorting conveyor 5 capable of sorting panel(s) 3 left to right and a pair of linearly-shaped straight conveyors 6 respectively disposed at ends of the sorting conveyor 5. While the panel(s) 3 are being conveyed by the straight conveyors 6, plural operators inspect and load the panel(s) 3.

The sorting conveyor 5 includes an arced conveyor 5B (first conveyor) positioned at the center of a conveying path and arced conveyors 5A, 5C respectively disposed at sides of the arced conveyor 5B. With the arced conveyors 5A, 5B, 5C circumferentially disposed, the sorting conveyor 5 has a semicircular shape in its entirety. The arced conveyor 5B is shaped as a quarter of a circle, an arc angle of which is 90 degrees, while the arced conveyors 5A, 5C are shaped as half-quarters of a circle.

The centrally-positioned arced conveyor 5B, which faces the transfer robot 4, has such a size that a single panel 3 can be mounted thereon. However, depending on size of the panel 3, an arced conveyor having a smaller arc angle or an arced conveyor having a larger arc angle may be used. In short, as long as the panel 3 can be reliably mounted on the arced conveyor 5B, the size of the arced conveyor 5B is not specifically limited.

The arced 5B drives a belt in a normal rotary direction and a reverse rotary direction. In contrast, the arced conveyors 5A, 5C unidirectionally drive the belts toward the straight conveyors 6. In the drawings, the direction in which the belt is driven (i.e., a direction in which the panel(s) 3 is conveyed) is indicated by arrows (→).

Figure 2:
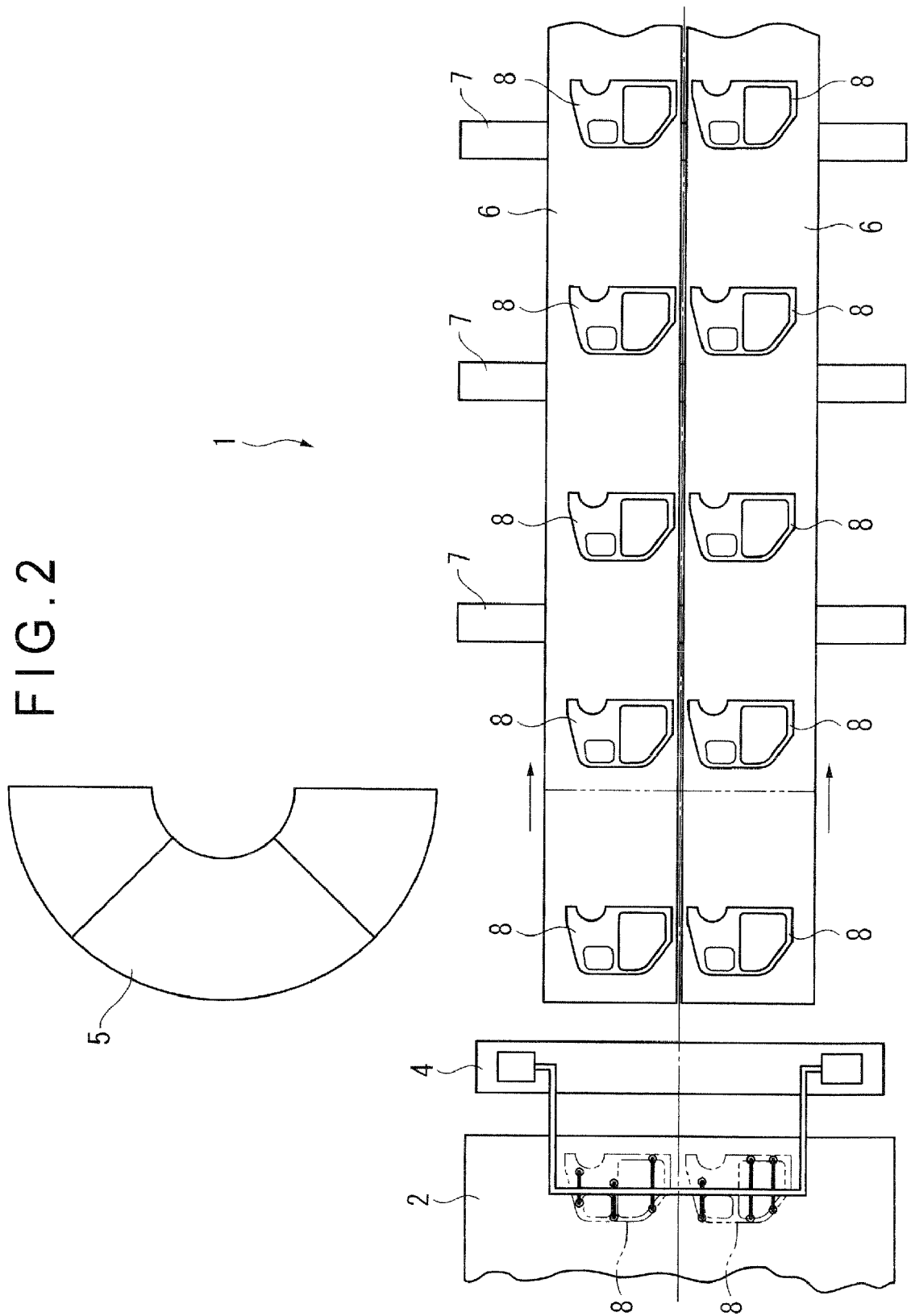
FIG. 2 is a plan view showing a panel-carrying-out apparatus capable of receiving two panels according to the first embodiment of the present invention.
Figure 3:
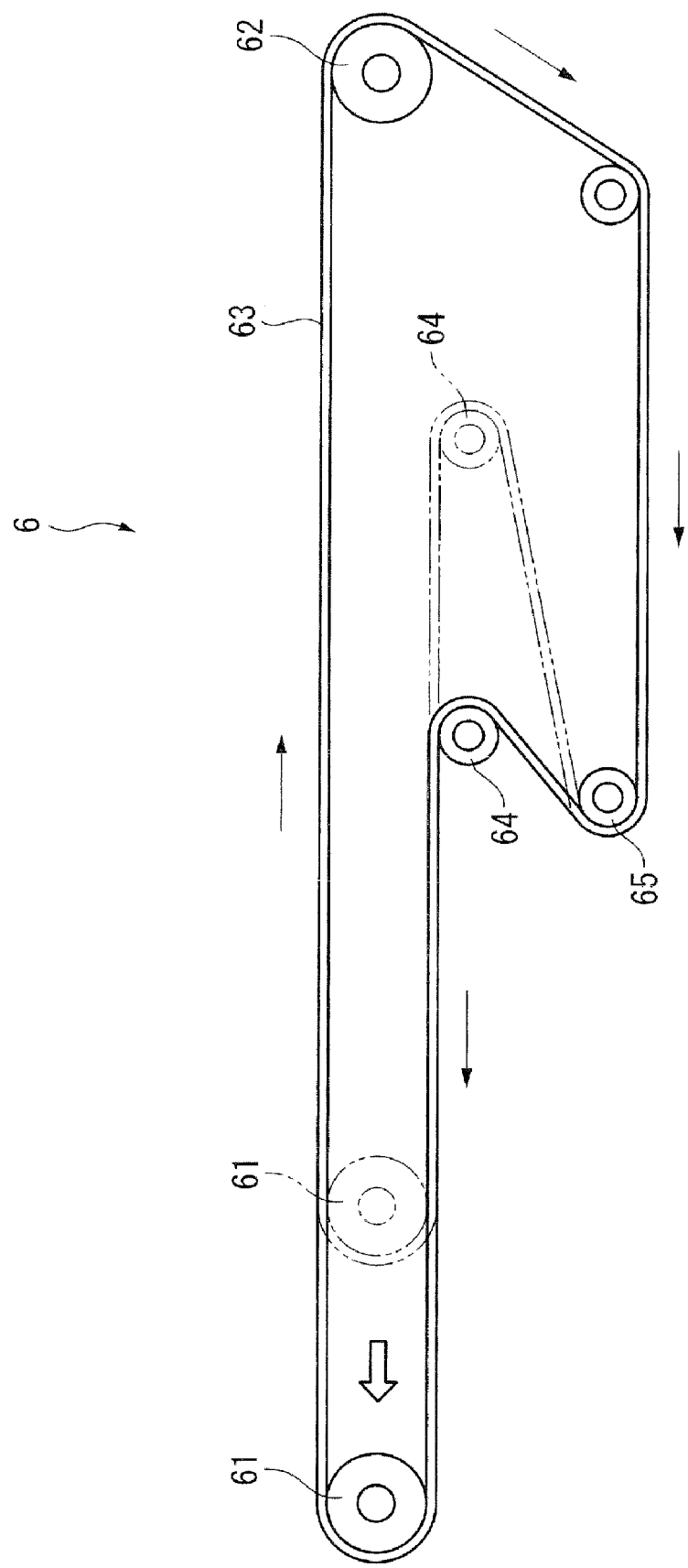
FIG. 3 is a side view schematically showing a straight conveyor in the first embodiment of the present invention.

As shown in FIG. 2, the panel-carrying-out apparatus 1 according to the present embodiment is also capable of receiving two panels 8. FIG. 2 is a plan view showing the panel-carrying-out apparatus having been arranged to receive the two panels 8. FIG. 3 is a side view schematically showing the straight conveyor 6.

When the panel-carrying-out apparatus is arranged to receive two panels, the sorting conveyor 5 is evacuated to a position shown in FIG. 2 (corresponding to a position shown in dashed-two dotted line in FIG. 1). Specifically, the sorting conveyor 5 is capable of being evacuated to the outside of straight conveyors 6 by sliding on a guide rail (not shown).

The pair of straight conveyors 6 are moved close to each other by using a guide rail 7 (see outline arrows in FIG. 1) and extended toward the upstream by a telescopic mechanism provided thereto. A position indicated by dashed-two dotted line in FIG. 2 is a position at which the straight conveyors 6 are located before being extended.

Specifically, as shown in FIG. 3, the straight conveyors 6 each has a drive roller 61 and a follower roller 62 disposed at the same height level. Around the rollers 61, 62, a belt 63 is wounded. The belt 63 is also wounded around small-diameter rollers 64, 65 respectively disposed at different height positions.

The drive roller 61 and the small-diameter roller 64 are axially supported by one frame (not shown) while the follower roller 62 and the small-diameter 65 are axially supported by another frame (not shown). The two frames are provided in a manner relatively movable in an extension direction (see outline arrow in FIG. 3). For instance, by moving the frames in the extension direction, a distance over which the panels 8 are conveyed by the belt 63 can be prolonged. Portion of the belt 63 corresponding to an extension in a carrying-out direction can be absorbed by moving the rollers 64, 65 close to each other.

Operation(s) for carrying out the panel(s) 3 using the sorting conveyor 5 will be described with reference to FIGS. 4 to 9.

Figure 4:
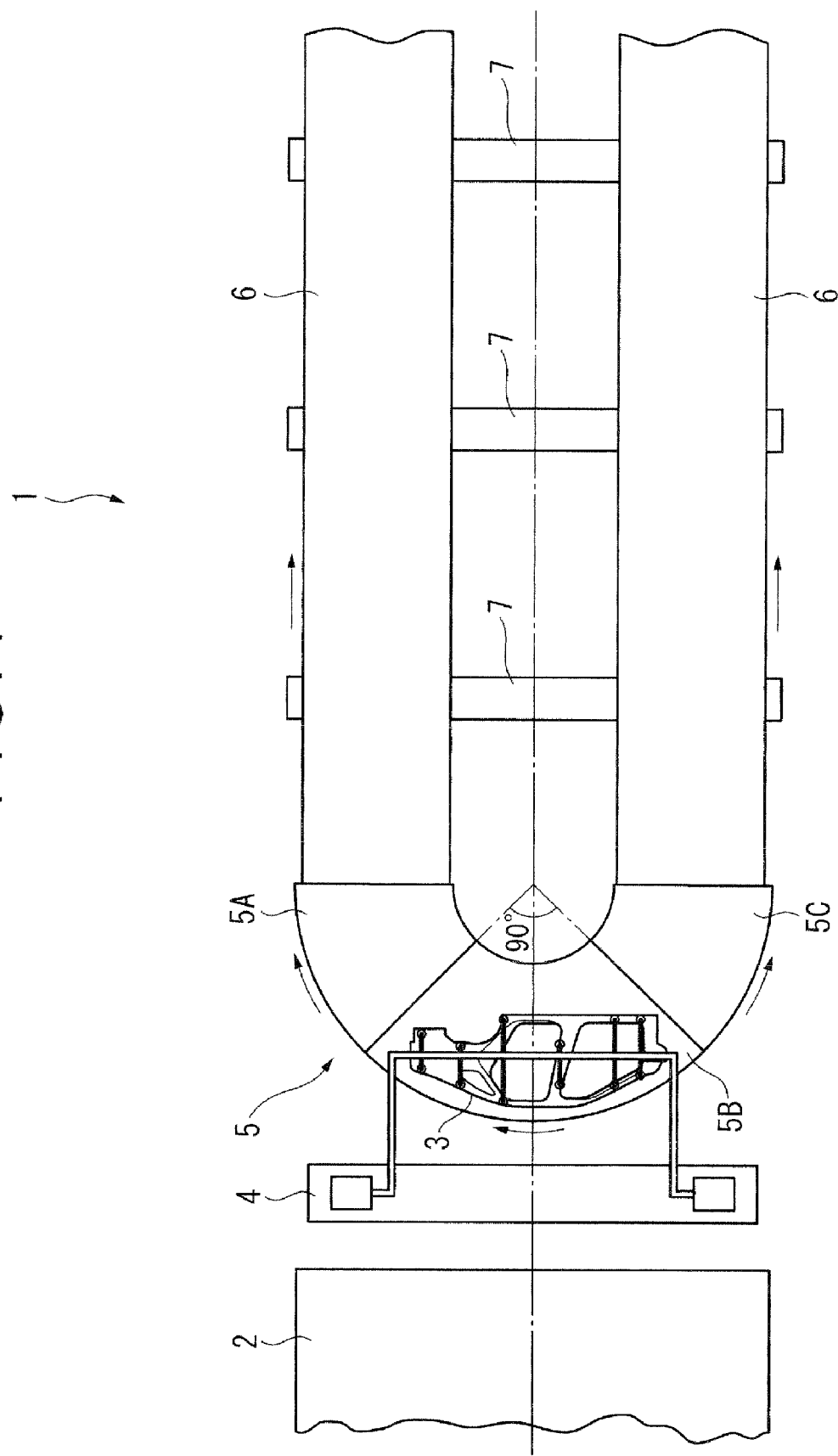
FIG. 4 shows operation(s) by which the panel is conveyed in the first embodiment of the present invention.
Figure 5:
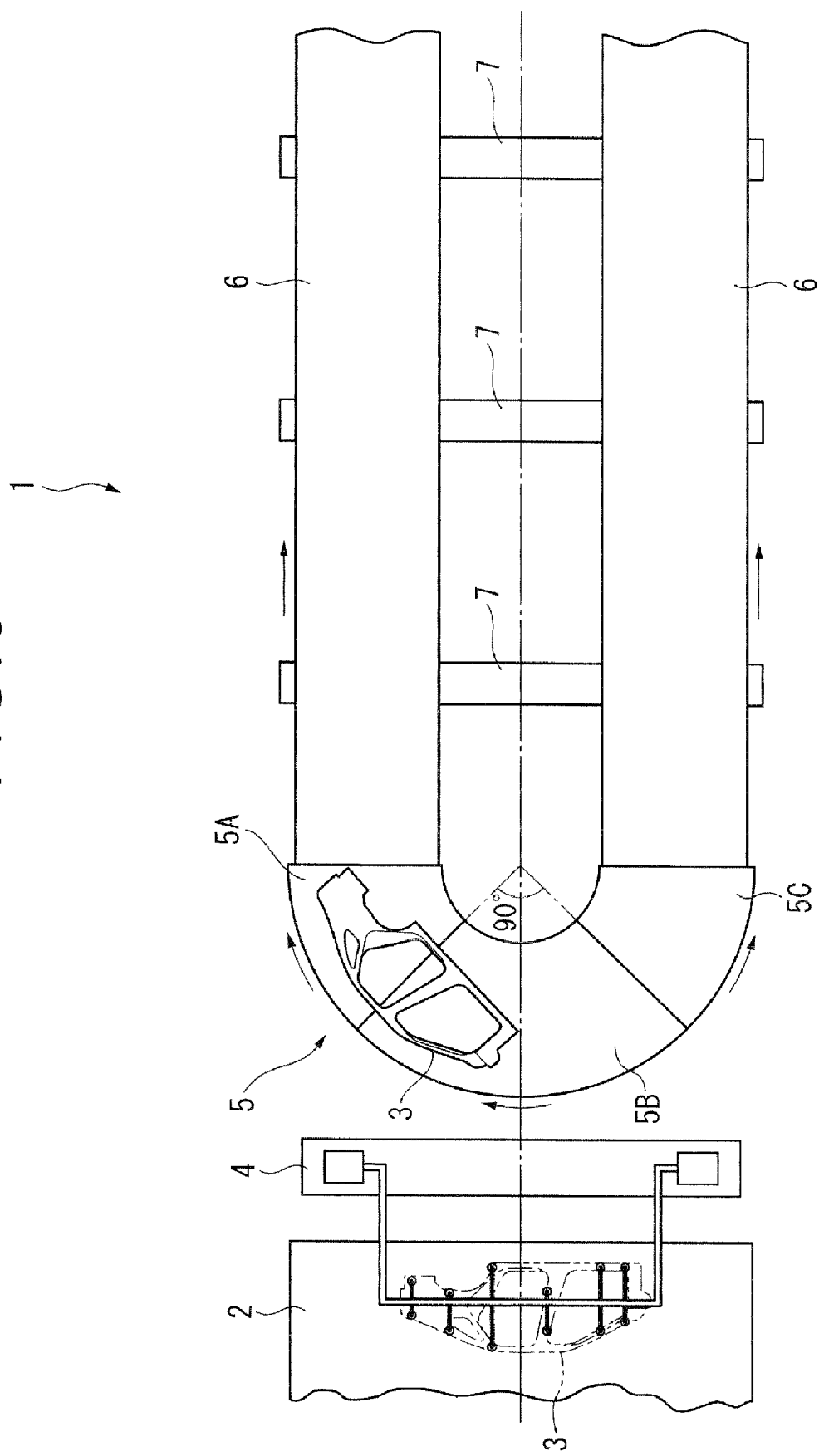
FIG. 5 shows operation(s) by which the panel is conveyed in the first embodiment of the present invention.
Figure 6:
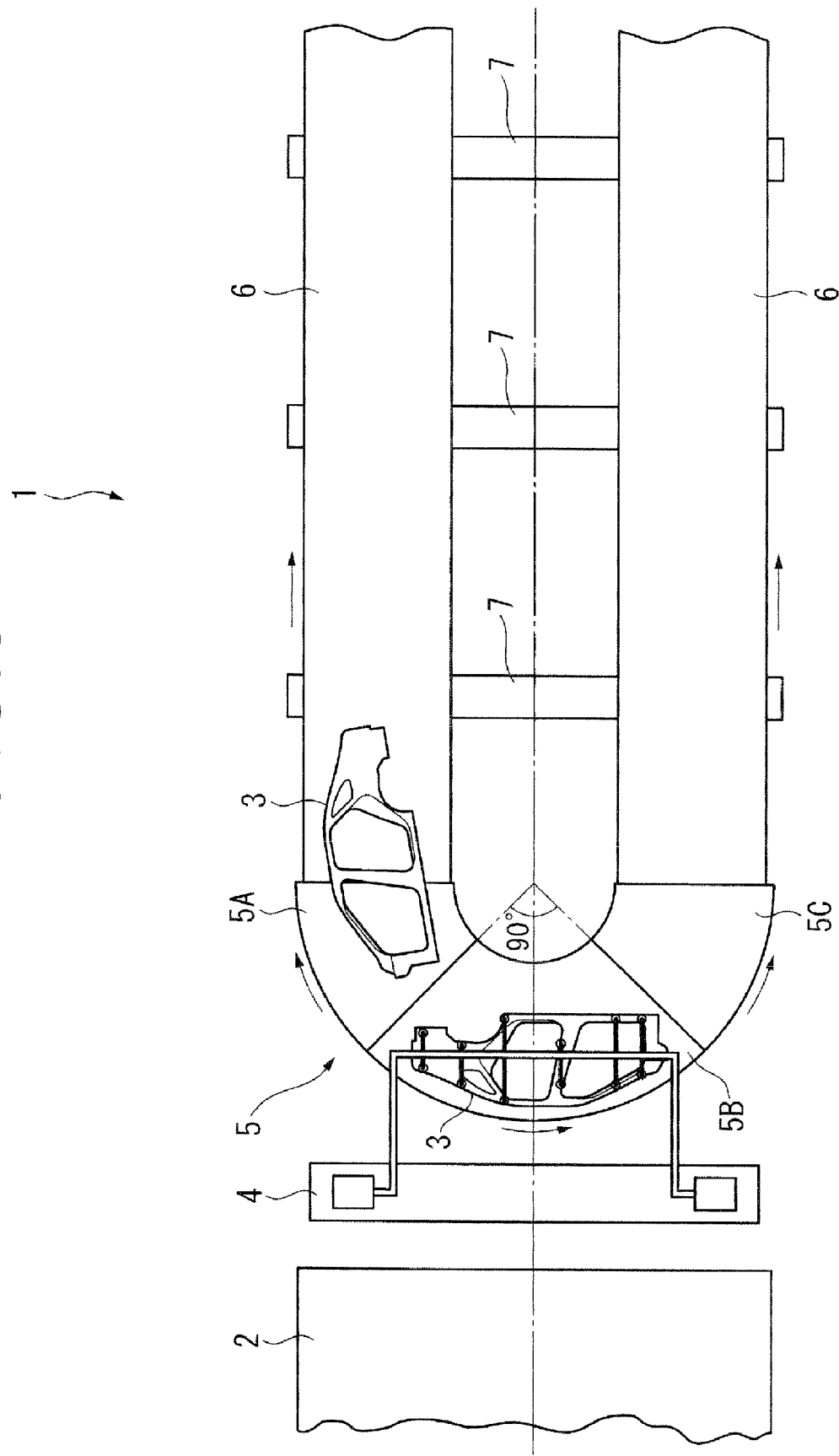
FIG. 6 shows operation(s) by which the panel is conveyed in the first embodiment of the present invention.
Figure 7:
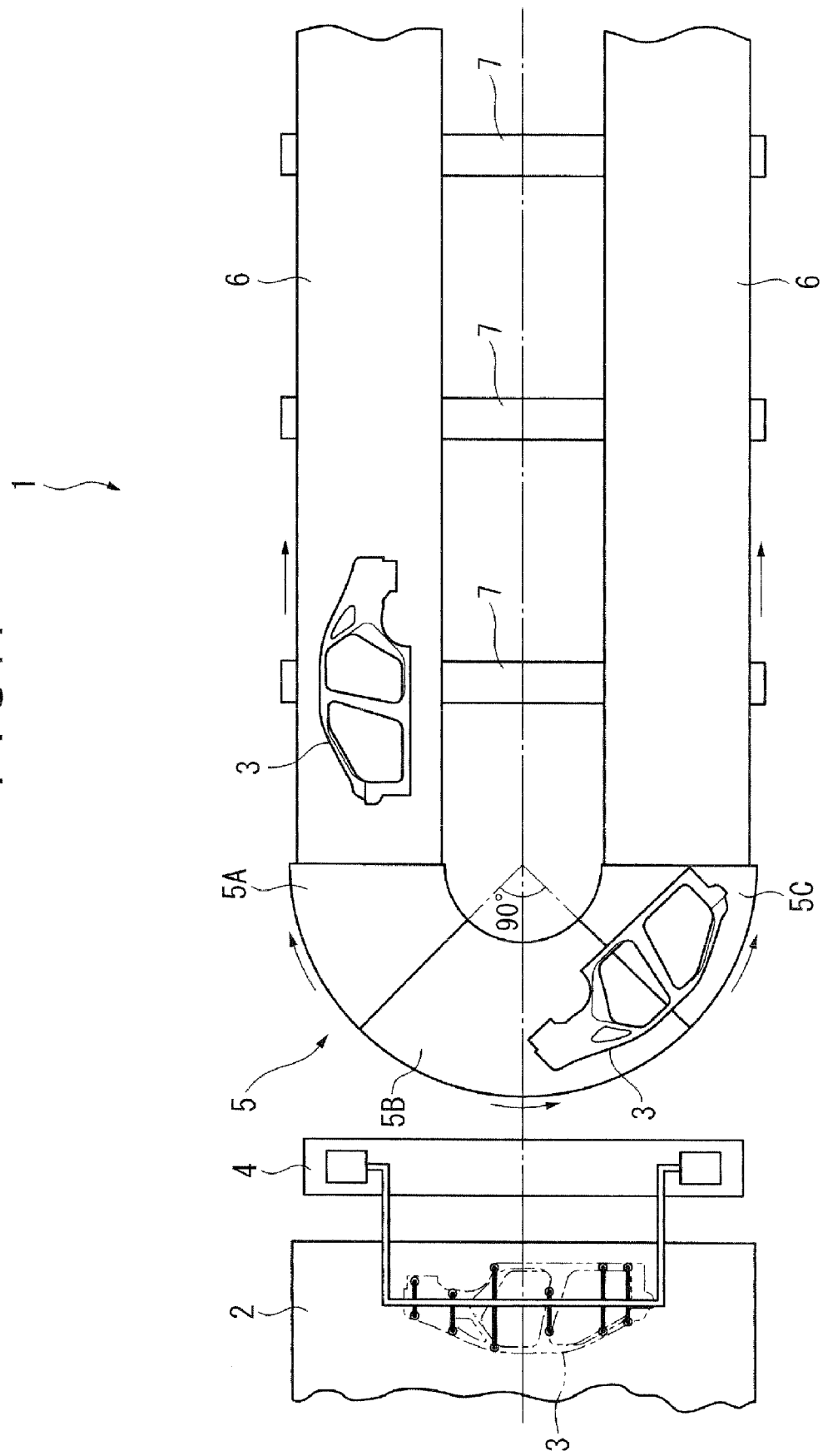
FIG. 7 shows operation(s) by which the panel is conveyed in the first embodiment of the present invention.
Figure 8:
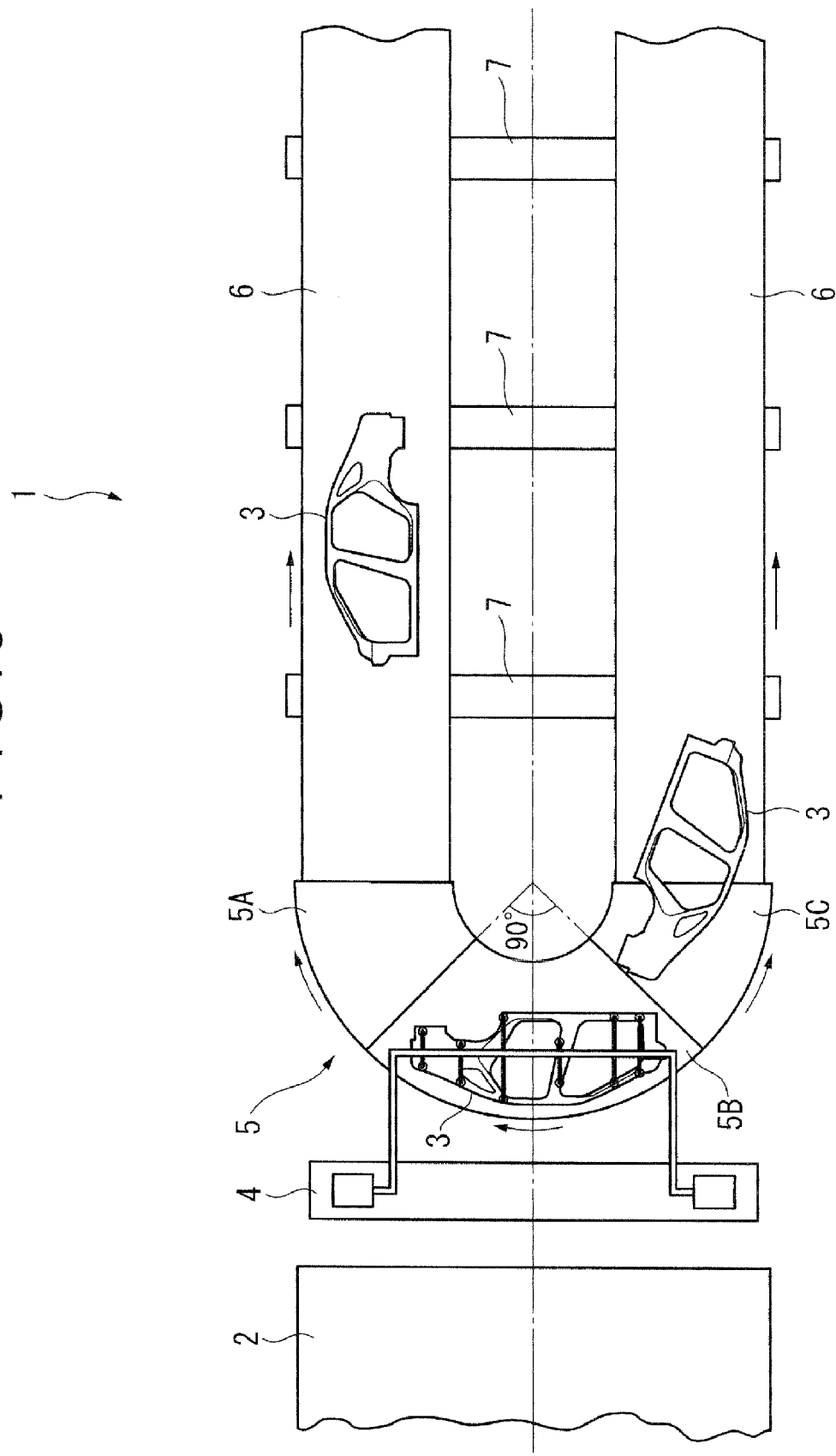
FIG. 8 shows operation(s) by which the panel is conveyed in the first embodiment of the present invention.
Figure 9:
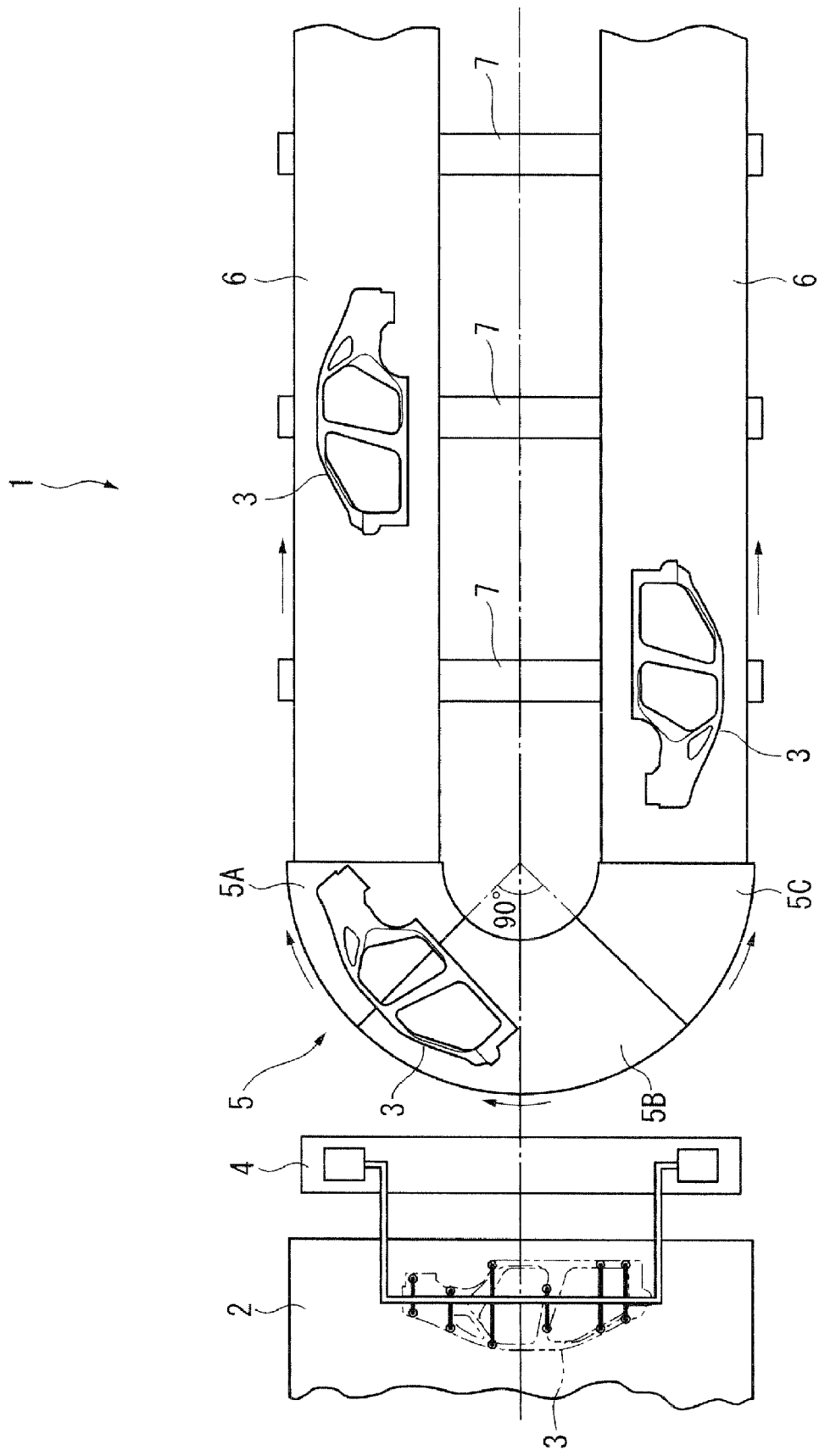
FIG. 9 shows operation(s) by which the panel is conveyed in the first embodiment of the present invention.

As shown in FIG. 4, the transfer robot 4 initially suctions the panel 3 having been processed by a press machine 2 and carries out the panel 3 to the arced conveyor 5B of the sorting conveyor 5. As shown in FIG. 5, the arced conveyor 5B is then, for instance, normally rotated to convey the panel 3 to the arced conveyor 5A. Subsequently, as shown in FIG. 6, the centrally-positioned arced conveyor 5B is suspended when the arced conveyor 5B becomes vacant, so that a next new panel 3 is transferred from the press machine 2 to the arced conveyor 5B. Then, as shown in FIG. 7, the arced conveyor 5B is reversely rotated to convey the panel 3 to the arced conveyor 5C. Likewise, as shown in FIG. 8 after the panel 3 is conveyed to the arced conveyor 5C, the centrally-positioned arced conveyor 5B is suspended when the arced conveyor 5B becomes vacant, so that a next new panel 3 is transferred from the press machine 2 to the arced conveyor 5B. As shown in FIG. 9, the arced conveyor 5B is then normally rotated to convey the panel 3 to the arced conveyor 5A.

By repeating the above steps, the panels 3 can be efficiently sorted out.

Subsequently, the arced conveyors 5A, 5C respectively located in the normal-rotary direction and the reverse-rotary direction convey the panels 3 to the corresponding straight conveyors 6. At this time, a posture of the panel 3 is turned by 90 degrees from a posture of the panel 3 when carried out from the press machine 2, so that longer sides of the panel 3 extend along the conveying direction, thereby enabling an operator to easily handle the panel 3.

Next, description will be made in relation to operation(s) for carrying out the panels 8 when the panel-carrying-out apparatus 1 is arranged to receive the two panels 8.

A panel 8 to be received by the panel-carrying-out apparatus 1 arranged to receive two panels are smaller in size than the panel 3 to be received by the panel-carrying-out apparatus 1 arranged to receive single panel. Thus, since operators can easily handle the panel 8, the panel 8 does not need to be turned by 90 degrees using the sorting conveyor 5. Accordingly, when the panel-carrying-out apparatus 1 is arranged to receive two panels, the sorting conveyor 5 is evacuated to the outside of the panel-carrying-out apparatus 1, and the straight conveyors 6 are moved close to each other while being extended toward the transfer robot 4 at the same time. In this state, the transfer robot 4 simultaneously suctions two panels 8 ejected from the press machine 2, so that the two panels 8 are carried out to the two straight conveyors 6.

Second Exemplary Embodiment

Figure 10:
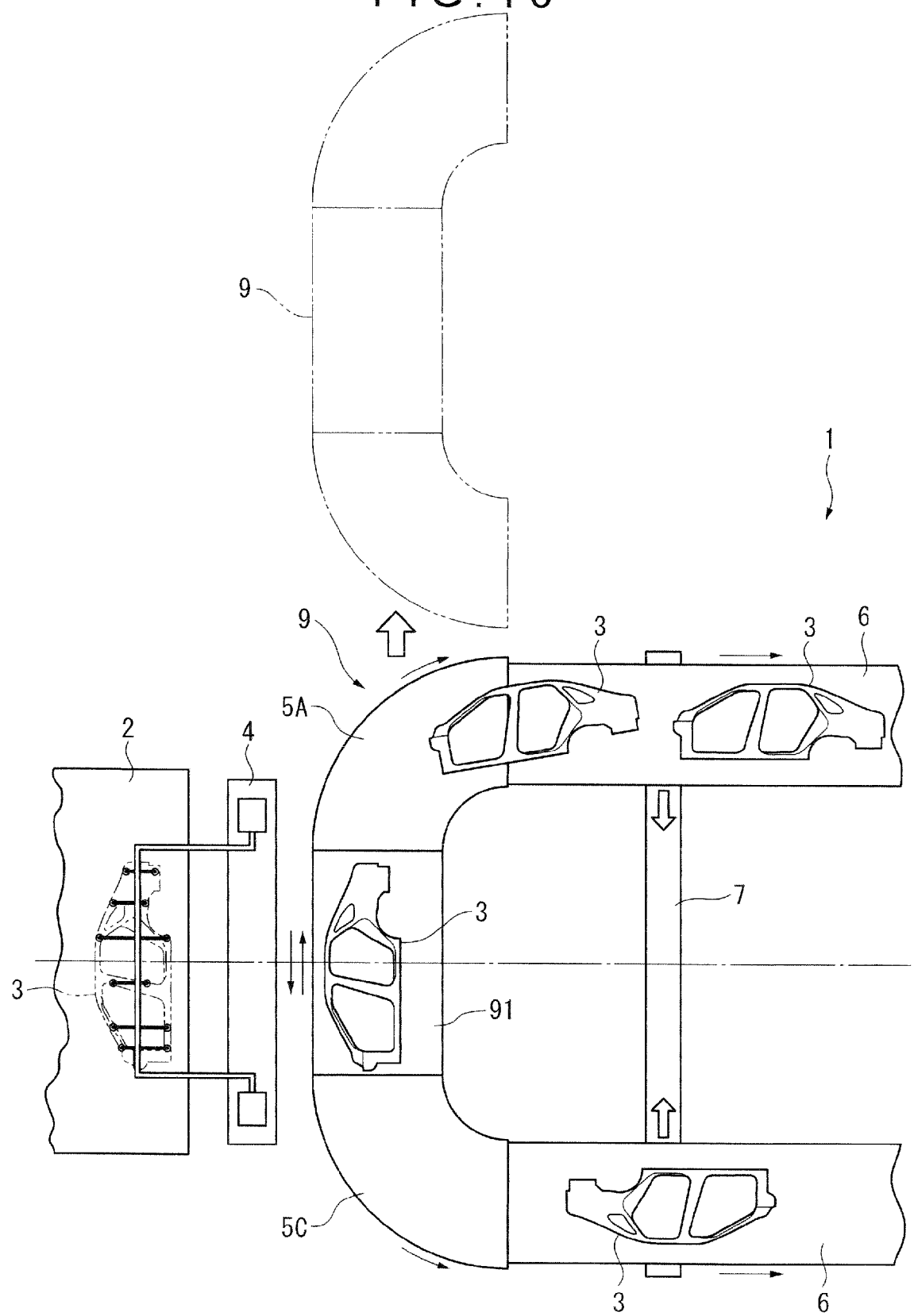
FIG. 10 is a plan view showing a panel-carrying-out apparatus according to a second exemplary embodiment of the present invention.

FIG. 10 is a plan view showing the entirety of a panel-carrying-out apparatus according to a second exemplary embodiment of the present invention.

In FIG. 10, the panel-carrying-out apparatus 1, which is disposed at a position downstream to the transfer robot 4, includes a sorting conveyor 9 capable of sorting the panel(s) 3 left to right and the pair of linearly-shaped straight conveyors 6 respectively disposed at ends of the sorting conveyor 9.

The sorting conveyer 9 includes a straight conveyor 91 (first conveyor) positioned at the center of the conveying path and the arced conveyors 5A, 5C respectively disposed at sides of the straight conveyor 91. The straight conveyor 91 is linearly shaped while the arced conveyors 5A, 5C each are shaped as a quarter of a circle.

As in the first embodiment, the centrally-positioned straight conveyer 91, which faces the transfer robot 4, has such a size that a single panel 3 can be mounted thereon.

The straight conveyor 91 drives a belt in a normal rotary direction and a reverse rotary direction. In contrast, the arced conveyers 5A, 5C unidirectionally drives the belt toward the straight conveyer 6 as do the arced conveyors 5A, 5C of the first embodiment.

As in the first embodiment, the panel-carrying-out apparatus 1 according to the present embodiment is also capable of receiving two panels 8 as shown in FIG. 2. When the panel-carrying-out apparatus is arranged to receive two panels, the sorting conveyor 9 is evacuated to a position shown in FIG. 10 (i.e., a position shown in dashed-two dotted line in FIG. 10) by sliding on a guide rail (not shown). On the other hand, as in the first embodiment, the pair of straight conveyors 6 are also moved close to each other by using the guide rail 7 (see outline arrows in FIG. 10) and extended toward the upstream by the telescopic mechanism provided thereto.

Operation(s) for carrying out the panel(s) 3 using the sorting conveyor 9 will be described below. A difference between the present embodiment and the first embodiment in the operation(s) for carrying out the panel(s) 3 is only that the arced conveyor 5B is used in the first embodiment while the straight conveyor 91 is used in the present embodiment. Thus, operation(s) for carrying out the panel(s) 3 in the present embodiment will be simply described below.

Initially, the transfer robot 4 carries out the panel 3 to the straight conveyor 91. Then, the straight conveyor 91 is normally rotated to carry out the panel 3 to the arced conveyor 5A. When the straight conveyor 91 becomes vacant with the panel 3 being carried out to the arced conveyor 5A, a new panel 3 is transferred thereto from the press machine 2, so that the straight conveyor 91 is reversely rotated to carry out the panel 3 to the arced conveyor 5C. By repeating the above steps, the panels 3 can be efficiently sorted out.

Also in the present embodiment, a posture of the panel 3 is turned by 90 degrees from a posture of the panel 3 when carried out from the press machine 2, so that longer sides of the panel 3 extend along the conveying direction, thereby enabling an operator to easily handle the panel 3.

Description of operation(s) for carrying out the panels 8 when the panel-carrying-out apparatus 1 is arranged to receive the two panels 8 using the guide rail 7 will be omitted because the operation(s) is the same as in the first embodiment.

The straight conveyor 91 may include two divisional conveyors. With this arrangement, the panel-carrying-out apparatus 1 can be arranged to receive two panels 8.

Third Exemplary Embodiment

Figure 11:
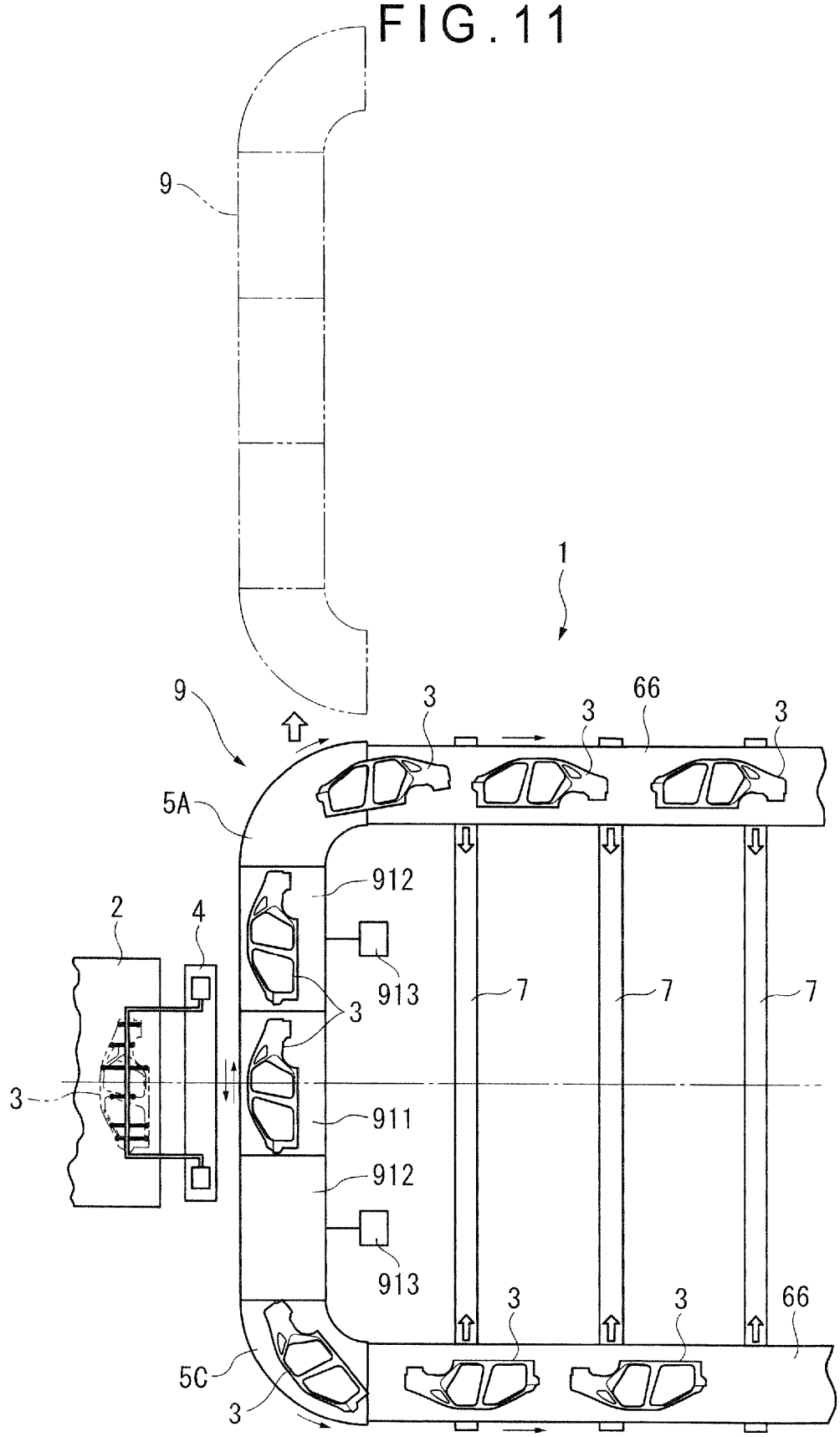
FIG. 11 is a plan view showing a panel-carrying-out apparatus according to a third exemplary embodiment of the present invention.

FIG. 11 is a plan view showing the entirety of a panel-conveying apparatus according to a third exemplary embodiment.

In FIG. 11, as in the second embodiment, a panel-carrying-out apparatus 1 according to the third embodiment includes the sorting conveyor 9 and a pair of linearly-shaped third straight conveyors 66 respectively disposed at ends of the sorting conveyor 9.

The sorting conveyor 9 includes a first conveyor 911 positioned at the center of the conveying path, linearly-shaped second conveyors 912 (intermediate conveyors) respectively disposed at ends of the first conveyor 911 and the arced conveyors 5A, 5C respectively disposed at sides of the second conveyors 912.

The first conveyor 911, on which the panel 3 from the press machine 2 is initially mounted, is adapted to be driven normally or reversely at high speed so as to catch up with high-speed manufacturing of the panels 3 by the press machine 2.

The second conveyors 912 are kept driven at high speed unidirectionally in predetermined direction(s) until the panel 3 is carried out thereto from the first conveyor 911 while being kept driven at low speed in predetermined direction(s) until the panel 3 is carried out from the second conveyors 912 to the arced conveyors 5A, 5C. The second conveyor 912 is connected with a timer 913.

The timer 913 is adapted to set in advance a time for conveying the panel 3 from the first conveyor 911 to the second conveyors 912 and a time for conveying the panel 3 to the arced conveyors 5A, 5C after the panel 3 is conveyed to the second conveyors 912. When the set time has elapsed, the timer 913 transmits a time elapse signal to the second conveyors 912. With this arrangement, when the second conveyors 912 receive the time elapse signal from the timer 913, the driving speed of the second conveyors 912 is switched to high speed or low speed.

The third straight conveyors 66 are driven in a predetermined direction at such low speed that inspectors can inspect the panel(s) 3 conveyed from the arced conveyors 5A, 5C. The arced conveyors 5A, 5C are driven in predetermined directions at low speed because high-speed driving of the arced conveyors 5A, 5C will apply centrifugal force on the conveyed panels 3, which may lead to displacement in the mounting positions of the panels 3.

Operation(s) for carrying out the panel(s) 3 in the present embodiment will be described below. In the present embodiment, when the transfer robot 4 transfers the panel 3 to the first conveyor 911, the first conveyor 911 starts to be driven at high speed in the normal rotary direction. The panel 3 is conveyed from the first conveyor 911 to the second conveyor 912. With the time for conveying the panel 3 from the first conveyor 911 to the second conveyor 912 being set in advance by the timer 913, the timer 913 transmits the time elapse signal to the second conveyor 912 after the set time has elapsed. Then, the second conveyor 912 having been driven at high speed is switched to be driven at low speed when the panel 3 is conveyed to the second conveyor 912. The panel 3 is subsequently conveyed from the second conveyor 912 to the arced conveyor 5A. The time for conveying the panel 3 from the second conveyor 912 to the arced conveyor 5A is set in advance by the timer 913. After the set time has elapsed, the time elapse signal is transmitted to the second conveyors 912, so that the second conveyor 912 having been driven at low speed is switched to be driven at high speed when the panel 3 is conveyed to the arced conveyor 5A. By repeating the above steps, the first conveyor, which is adapted to be driven at high speed switchably in the normal rotary direction or the reverse rotary direction, can easily sort out the panels 3 ejected at high speed from the press machine 2.

Then, a new panel 3 is transferred from the press machine 2 to the first conveyor 911 when the first conveyor 911 becomes vacant, and the first conveyor 911 subsequently starts to be driven at high speed in the reverse rotary direction. The operations of carrying out the panel 3 thereafter are the same as in the above-described steps.

In the present embodiment, by providing the second conveyors 912 adapted to be driven switchably at high speed or low speed between the first conveyor 911 and the arced conveyors 5A, 5C, the first conveyor 911 can be constantly driven at high speed irrespective of the driving speed of the arced conveyors 5A, 5C. With this arrangement, the panel-carrying-out apparatus 1 according to the present embodiment can sort out the panels 3 at high speed, and thus is applicable to high-speed manufacturing of the panels 3.

In addition, a posture of the panel 3 is turned by 90 degrees from a posture of the panel 3 when carried out from the press machine 2, thereby providing the same effect(s) as in the above embodiments. By using the guide rail 7, the panel-carrying-out apparatus 1 can be arranged to receive the two panels 8.

Fourth Exemplary Embodiment

Figure 12:
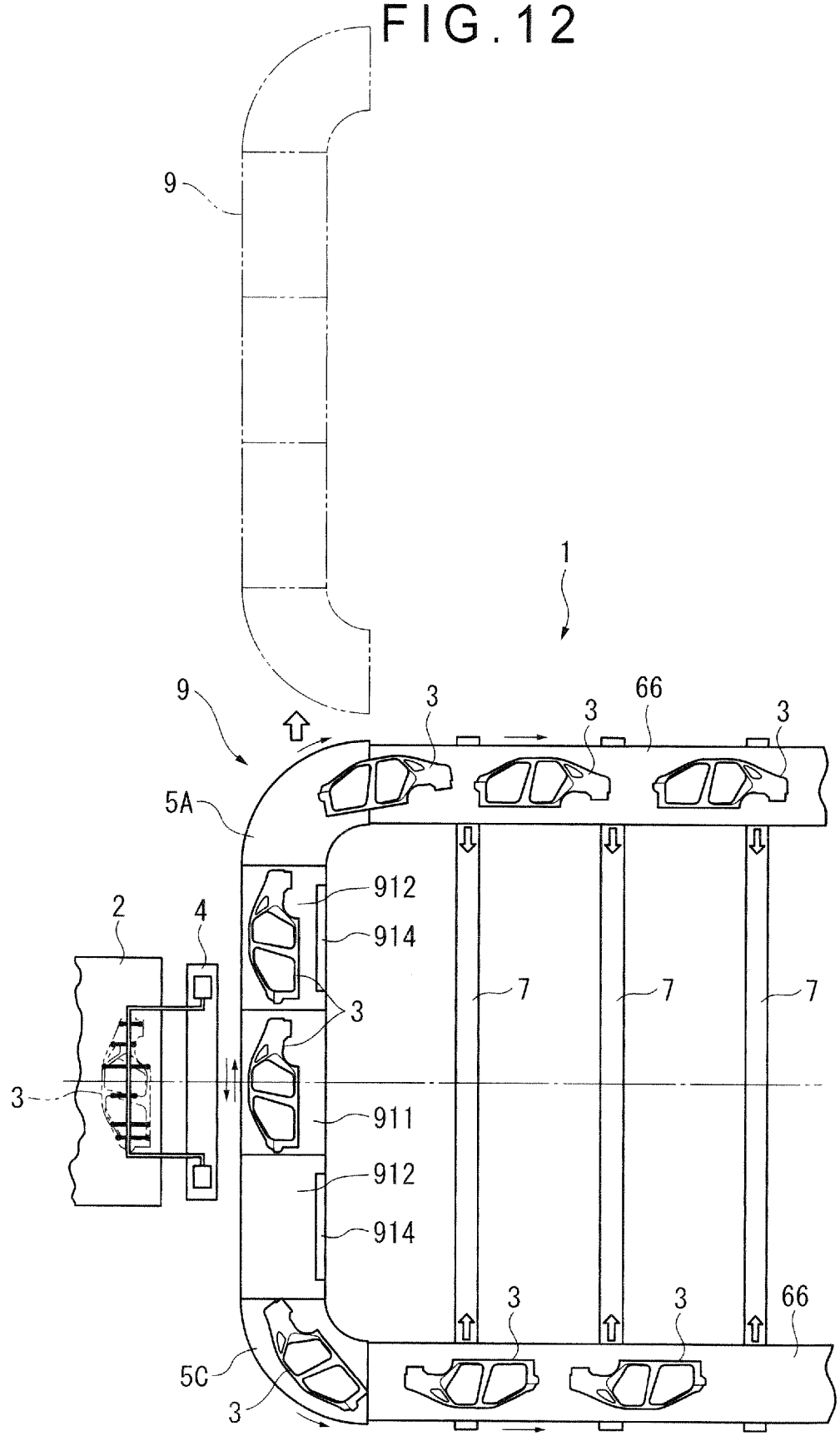
FIG. 12 is a plan view showing a panel-carrying-out apparatus according to a fourth exemplary embodiment of the present invention.

FIG. 12 is a plan view showing the entirety of a panel-conveying apparatus according to a fourth exemplary embodiment. While the driving speed of the second conveyors 912 is switched based on the elapse of the time set by the timer 913 in the third embodiment, the driving speed of the second conveyors 912 is switched by detecting the panel(s) 3 with a non-contact sensors 914.

The non-contact sensors 914 attached to the second conveyors 912 each detect that the panel 3 has been conveyed to the second conveyor 912 or that the second conveyor 912 has become vacant, and transmit a detection signal to the second conveyor 912. When the second conveyor 912 receives the detection signal, the driving speed of the second conveyor 912 is switched to high speed or low speed.

Operation(s) for carrying out the panel(s) 3 in the present embodiment is the same as in the third embodiment except for a method for detecting the panel 3 conveyed to the second conveyor 912. Therefore, description will be made only for the method of detecting the panel(s) 3. When the panel 3 is conveyed from the first conveyor 911 to the second conveyor 912, the non-contact sensor 914 detects the panel 3 and transmits the detection signal to the second conveyor 912. When the second conveyor 912 having been driven at high speed receives the detection signal, the driving speed of the second conveyor 912 is switched to low speed. Then, when the panel 3 is conveyed from the second conveyor 912 to the arced conveyor 5A (or 5C) and the second conveyor 912 becomes vacant, the non-contact sensor 914 detects the vacancy of the second conveyor 912 and transmits the detection signal to the second conveyor 912. When the second conveyor 912 having been driven at low speed receives the detection signal, the driving speed of the second conveyor 912 is switched to high speed.

With this arrangement, the present embodiment can provide the same effect(s) as in the third embodiment.

It should be noted that the present invention is not limited to the above-described embodiment(s) but may include any other arrangement and the like that may achieve an object of the present invention. Such modification(s) as described below is also within the scope of the present invention.

For instance, while the arc angle of the arced conveyor 5B is 90 degrees as shown in FIG. 1 in the above embodiment, the arc angle is not limited thereto but may be any other suitable angle such as 60 degrees. In short, as long as the panel 3 can be reliably mounted thereon, the arc angle may be any other angle. The number of the arced conveyors included in the sorting conveyor may also be suitably determined.

The priority application Number JP2007-206463 upon which this patent application is based is hereby incorporated by reference.

What is claimed is:

1. A panel-carrying-out apparatus for conveying panels, the panels being ejected from a press machine via a transfer robot, said apparatus comprising:
   a movable sorting conveyor located at a position downstream of the transfer robot; and
   a pair of movable, straight conveyors respectively disposed at ends of the sorting conveyor,
   wherein the sorting conveyor comprises:
      a first conveyor opposed to the transfer robot and receiving each of the panels transferred by the transfer robot; and
      a pair of arced conveyors respectively disposed between the first conveyor and the pair of straight conveyors,
   wherein at least the first conveyor is driven switchably in a normal direction or a reverse direction, and
   wherein the sorting conveyor is configured and operable to be movable from a conveying path of the panels in which it is in a position interposed between the transfer robot and the pair of straight conveyors,
   wherein the pair of straight conveyors are configured and operable to be movable closer to and away from the transfer robot when the sorting conveyor is moved from the conveying path such that panels are conveyed directly from the transfer robot to the pair of straight conveyors, and
   wherein the pair of straight conveyors are configured and operable to be also movable closer to and away from each other in a direction perpendicular to the conveying path of the panels on the straight conveyors.

2. The panel-carrying-out apparatus according to claim 1, wherein:
   the first conveyor is shaped as an arc,
   the first conveyor and the arced conveyors are disposed along a circumferential direction,
   the sorting conveyor comprises the arc-shaped first conveyor and at least the pair of arced conveyors, and
   the arc-shaped first conveyor has a size such that a single one of the panels is substantially mounted on the arc-shaped first conveyor.

3. The panel-carrying-out apparatus according to claim 1, wherein:
   the first conveyor is linearly shaped,
   the sorting conveyor comprises the linearly-shaped first conveyor and at least the pair of arced conveyors, and
   the linearly-shaped first conveyor has a size such that a single one of the panels is substantially mounted on the linearly-shaped first conveyor.

4. The panel-carrying-out apparatus according to claim 3, further comprising a linearly-shaped intermediate conveyor arranged between the first conveyor and each of the arced conveyors of the sorting conveyor.

5. The panel-carrying-out apparatus according to claim 4, wherein:
   the first conveyor is driven at high speed switchably in the normal direction or the reverse direction,
   the straight conveyors and the arced conveyors are continuously driven at low speed in predetermined directions respectively, and
   each intermediate conveyor is driven at high speed in a predetermined direction until each of the panels is conveyed to the intermediate conveyor from the first conveyor while being driven at low speed in the predetermined direction until each of the panels is conveyed to a respective one of the arced conveyors from the intermediate conveyor.

6. The panel-carrying-out apparatus according to claim 5, wherein switch of driving speed of each intermediate conveyor between the high speed and the low speed is controlled based on a time elapse signal from a timer.

7. The panel-carrying-out apparatus according to claim 5, wherein switch of driving speed of each intermediate conveyor between the high speed and the low speed is controlled based on a detection signal from a non-contact sensor for detecting the panels.

8. The panel-carrying-out apparatus according to claim 1, further comprising means for moving the pair of straight conveyors toward and away from the transfer robot.

9. The panel-carrying-out apparatus according to claim 1, further comprising means for moving the pair of straight conveyors toward and away from each other in the direction perpendicular to the conveying path of the panels on the straight conveyors.

* * * * *